US006704615B1

(12) United States Patent
Veenstra et al.

(10) Patent No.: US 6,704,615 B1
(45) Date of Patent: Mar. 9, 2004

(54) OBJECT DISPENSER

(75) Inventors: John H. Veenstra, Pittsford, NY (US); Kenneth B. Lowes, Vancouver (CA)

(73) Assignee: PJ Solutions, Inc., Fairport, NY (US)

( * ) Notice: Subject to any disclaimer, the term of this patent is extended or adjusted under 35 U.S.C. 154(b) by 0 days.

(21) Appl. No.: 10/254,296

(22) Filed: Sep. 25, 2002

(51) Int. Cl.[7] ........................ G06F 17/00; B65G 59/00; B65H 3/30; G07F 11/16

(52) U.S. Cl. ........................................ 700/231

(58) Field of Search ................................ 700/231, 232, 700/236; 221/264, 289, 295

(56) References Cited

U.S. PATENT DOCUMENTS

| | | | | |
|---|---|---|---|---|
| 3,733,007 A | * | 5/1973 | Ungerman | 221/295 |
| 4,303,179 A | * | 12/1981 | Spring | 221/298 |
| 5,463,514 A | | 10/1995 | Yaeger | 360/105 |
| 5,573,413 A | | 11/1996 | David et al. | 439/159 |
| 5,629,662 A | | 5/1997 | Floyd et al. | 337/36 |
| 5,791,516 A | * | 8/1998 | Wittern, Jr. et al. | 221/301 |
| 5,990,777 A | | 11/1999 | Whiteman, Jr. | 337/140 |
| 6,017,231 A | | 1/2000 | Yoshitsugu et al. | 439/159 |
| 6,338,007 B1 | | 1/2002 | Braodfield | 700/231 |

FOREIGN PATENT DOCUMENTS

| | | |
|---|---|---|
| JP | 02-197782 A | 8/1990 |

* cited by examiner

*Primary Examiner*—Gene O Crawford
(74) *Attorney, Agent, or Firm*—Brown & Michaels, PC

(57) ABSTRACT

An object dispenser uses a support structure arranged to receive and hold a compact array of objects for dispensing. The objects can be contained in packages that are dispensed along with the objects from any location in the array. Gravity can provide the motive power for dispensing the objects when they are selectively released from the array. This is accomplished by retainers that hold the objects in place when latched and release the objects for dispensing when selectively unlatched.

28 Claims, 5 Drawing Sheets

OBJECT DISPENSER

TECHNICAL FIELD

Machines that automatically dispense objects.

BACKGROUND

Automatic dispensing machines have become increasingly popular because of their ability to deliver objects reliably to authorized recipients and thereby providing inventory control and saving labor costs that would otherwise be involved. A wide variety of dispensing machines has been developed to dispense different sorts of objects, and yet all these dispensers suffer from various problems.

Many automatic dispensing machines are large and heavy, take up floor space, and are expensive to build and maintain. They tend to include motors and mechanical movements that add to their weight, complexity, and expense. They also have to be reloaded at the dispensing site by a service man that transports the objects to be dispensed.

A departure from this trend occurs in U.S. Pat. No. 6,338,007, which suggests cells arrayed in drawers to make medical supplies available to authorized recipients. Drawers are loaded with a multiplicity of individual cells that can be transported to the dispensing site, but there, the cells are merely opened to provide access, rather than actually dispensing the intended objects.

Dispensing machines are also required to generate information on what is dispensed to which recipient. Here too, present machines either fail to do this completely or accomplish it in an inconvenient and expensive way.

Altogether, this invention aims at a simpler and more efficient automatic dispensing machine that is compact, and inexpensive. The invention also aims at versatility in dispensing a wide variety of objects and at convenience and efficiency in generating and transmitting information on dispensing transactions.

SUMMARY

The inventive dispenser uses a structure configured to support an array of objects to be dispensed. Retainers mounted on the support structure are latchable to hold the objects in their places in the array until the retainers are selectively unlatched to release the objects for dispensing. Mechanisms to unlatch the retainers are arranged in the support structure, preferably in communication with microcircuitry containing information on the loaded objects and generating information on objects dispensed.

The support structure, retainers, and unlatching mechanisms can be arranged in various ways to achieve advantages sought by the invention. For example, to pack objects densely into the array, a simple tubular structure can support the objects in a honeycomb pattern, with the support tubes distributed between the objects. If the objects vary in size and shape, they can be contained in packages that are dispensed from such an array. A support tube configuration also allows retainers to be mounted on the support tubes and unlatching mechanisms to be mounted within the support tubes. Microcircuitry arranged on a circuit board can be mounted to achieve both physical and electrical communication with the support tubes for dispensing purposes.

Preferred embodiments of the invention take advantage of gravity to power the motion required to dispense the objects. One way this can be done is by orienting the support structure at an inclination at a dispensing site so that unlatching one of the retainers releases an object for gravitationally falling out of and dispensing from the support array. For this purpose, the latchable and unlatchable retainers preferably block exit of objects from an access side of the support structure and spring open when unlatched to permit gravitational exit of objects. Springs can also be arranged to bias the objects into movement gravitationally out of the array.

To make the loading of objects for dispensing more efficient and to accomplish the necessary flow of loading and dispensing information back and forth between a supplier and a user, preferred embodiments of the invention preferably arrange the object supporting array within a portable case. This requires that the support structure, the retainers, and the unlatching mechanisms all be made light enough in weight so that when combined with a reasonable number of objects for dispensing, the case is light enough to be manually handled during transport. Keeping the support structure to a minimum weight, and making the retainers and unlatching mechanisms simple and light in weight helps make this possible. Including microcircuitry in the support structure can ensure that dispensing information travels efficiently between the supplier and the user. The microcircuitry also facilitates electromechanical actuation of retainer unlatching mechanisms, which can be made simple and light in weight by using shaped memory materials. Packaging objects that are not already packaged helps keep the supporting structure simple by not requiring that it provide package-like cells.

Preferred embodiments of the invention thus achieve significant advantages over existing dispensers. They can be made versatile, compact, low in cost, and inexpensive to load and maintain. They can do all this while generating and transmitting the necessary information and securely directing objects only to authorized recipients. They can thus facilitate analysis of a supply flow of the objects and reduce the cost of loading and delivering the objects that will become necessary.

DRAWINGS

DETAILED DESCRIPTION

The drawings illustrate a preferred embodiment of the invention in the form of a portable dispensing case that gravitationally dispenses packaged objects at a dispensing site. The invention is not limited to these particulars, however. The invention can also be applied to a fixed dispenser that does not use a portable case, and it can be used for objects that are not packaged or do not need packages to be retained in a dispensing array. The invention can also be embodied in a dispenser that does not rely on gravity for dispensing movement. The invention therefore has advantageous merits that can be applied in many forms other than the illustrated embodiment.

Case 10 holds an illustrated array of objects 25 to be dispensed. Although case 10 can be fixed in place, its possible portability is illustrated by carrying handle 11. Especially when case 10 is intended to be carried from a loading site to a dispensing site with a full load of objects 25, case 10 is desirably made as light in weight and as compact as possible. To advance these goals, objects 25 are preferably arranged in staggered rows as illustrated or otherwise packed as densely as possible. Strategies for packing objects 25 densely can vary with the configuration of the objects, which can be packages, as illustrated, in the form of tubular shapes that contain smaller objects of various sizes and shapes for dispensing. Plastic tubes in cylindrical or other cross-sectional form with closed ends and removable end caps (not shown) are inexpensively available and can be used to package and dispense a wide variety of objects. Object packages 25 can also have many shapes other than cylindrical, and these shapes can be affected by the configuration of the objects to be packaged. Whatever their shape, packages 25 are preferably made light in weight, especially if case 10 is to be portable.

Figure 1:
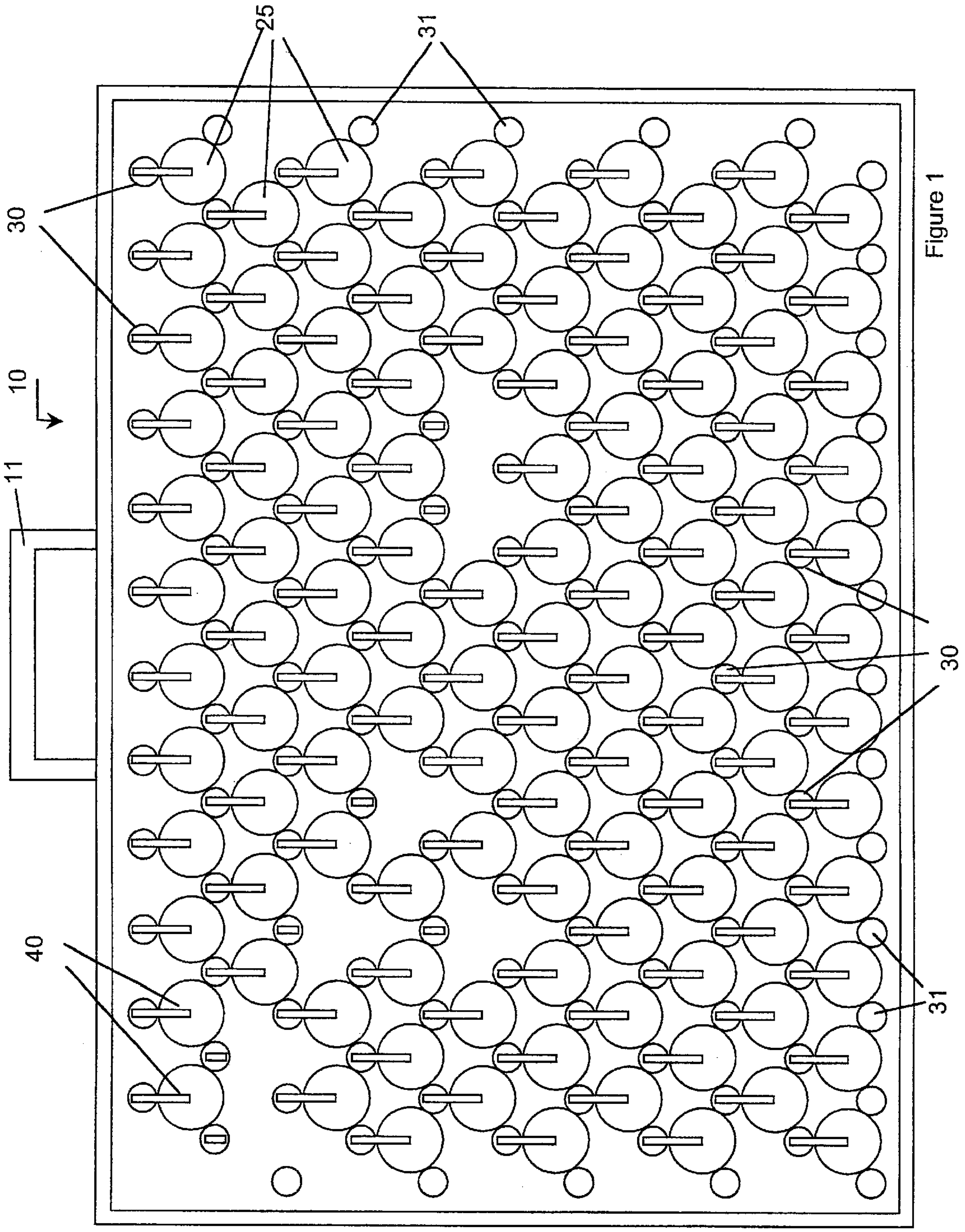
FIG. 1 is a schematic front elevational view of a preferred embodiment of the inventive dispenser arranged in a portable dispensing case.

The packages 25 shown in FIG. 1 all have the same diameter or size, but this need not be so. An array within case 10 can be configured to support packages of more than one diameter or length or otherwise differing in size or configuration.

Packages 25 offer a special advantage in dealing with objects differing in size and shape. Cutting tools and small parts for assembly purposes provide a good example. These can occur in an endless variety of shapes and sizes, many of which can fit within a uniform array of packages 25. The uniformity of packages 25 simplifies the support structure within case 10, which only has to be configured to receive one size, or possibly a few sizes, of object packages.

Packages 25 can also be recycled. When a packaged object is dispensed, the recipient can remove the package cap, obtain the object within the package, and drop the package in a nearby container for recycling.

Whether packaged or unpackaged, objects 25 are preferably held in place by support tubes 30 that are distributed among objects 25. Support tubes 30 can also vary widely in size and shape. Simple cylindrical tubes 30 are illustrated in the drawings, because these are economically available. Such support tubes can have different diameters and different cross-sectional shapes, however. It is also possible to mold a supporting structure within case 10 to have projections, rods, cups, or other configurations able to support an array of objects 25, without using tubes 30.

With a support rod or tube arrangement as shown in FIG. 1, objects 25 are slid into spaces between tubes 30 from the illustrated access side of case 10. During dispensing, objects are released from between tubes 30 and slide out of the access side of case 10. During transport, the illustrated access side of case 10 is closed by a moveable panel (not shown).

The array illustrated in FIG. 1 contains some gaps showing spaces from which objects 25 have been dispensed. As the supply of remaining objects 25 reduces, case 10 is replaced with a loaded case and is brought to a reloading site where it is reloaded with a supply of objects 25 for eventual return to a dispensing site. Alternatively, if case 10 is fixed in place, it is reloaded at its dispensing site.

Support tubes 30 have an advantage over other object supporting structures in being able to mount and contain mechanisms for holding and selectively releasing objects 25 from their positions in the array. For this purpose, support tubes 30 preferably include retainers 40 mounted on the illustrated access ends 32 of the support tubes 30. Retainers 40 can be latched in the positions illustrated for all the spaces containing objects 25, and in their latched positions, the retainers block any exit of objects 25 from the array. When retainers 40 are unlatched, they preferably spring open to the positions illustrated for the empty array spaces from which objects have been dispensed. This moves retainers 40 into alignment with tubes 30 where they are out of the way of an exit path of objects 25 from the array. A few support tubes 31 arranged around sides and bottom of the array within case 10, hold objects 25 in position without requiring retainers 40. Although retainers 40 are illustrated as positioned above the spaces holding objects 25, they can also be arranged below or along side the retained objects. The illustrated staggered rows of objects 25 allow each object to be held in its array position by three support tubes, preferably spaced 120° apart around each object space.

Figure 2:
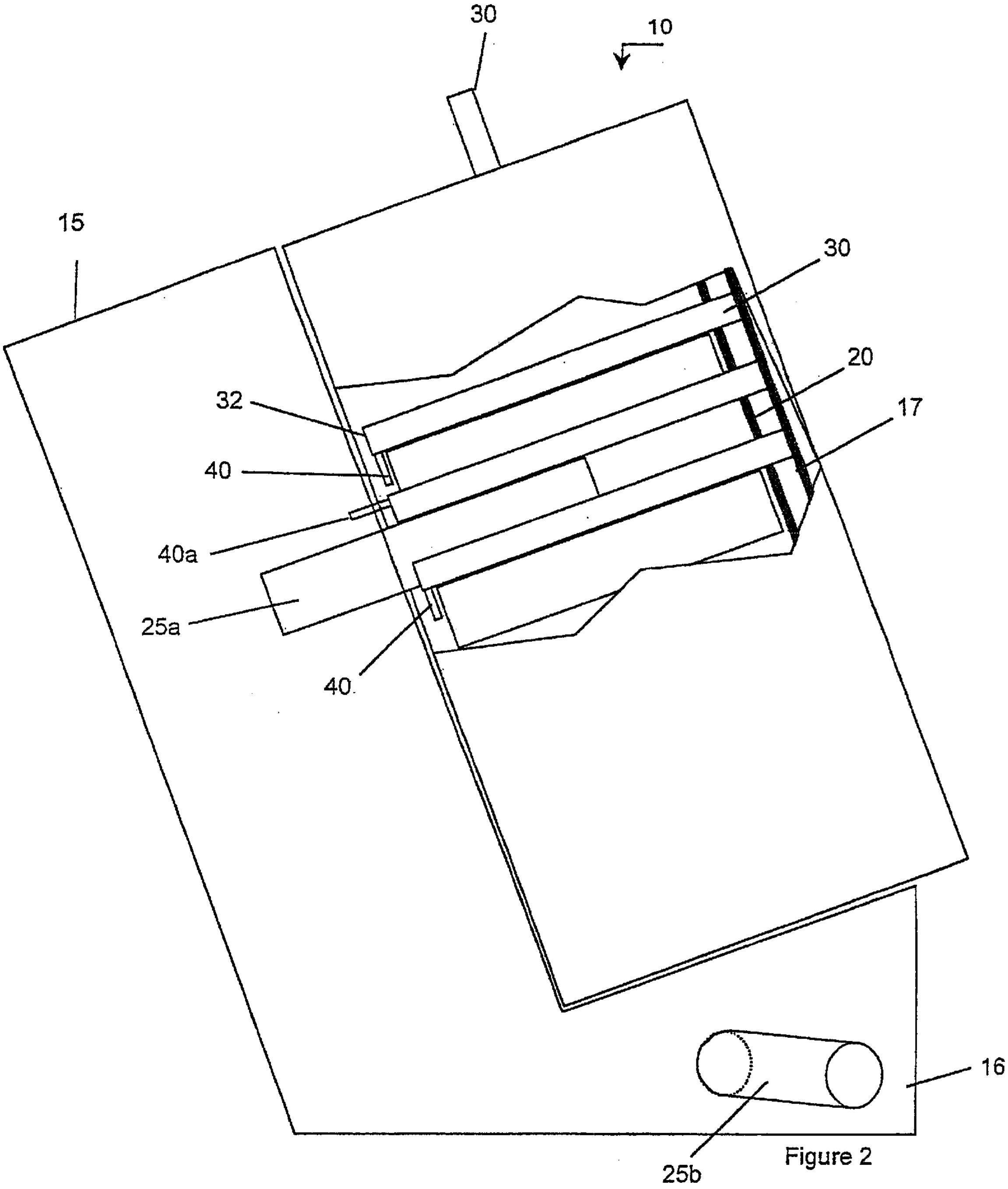
FIG. 2 is a schematic and partially cut away side elevational view of the portable dispensing case of FIG. 1 arranged at a dispensing site.

Case 10 is preferably mounted at an inclination at a dispensing site 15, as schematically shown in FIG. 2. The inclination angle is sufficient to allow objects 25 to fall out of the array and be dispensed gravitationally to an access tray 16 below case 10. A suitable inclination angle is preferably set depending on the configuration of objects 25 and the static friction occurring between objects 25 and tubes 30. Inclination of tubes 30 and objects 25 can be built into case 10, but especially for portable cases, objects 25 and support tubes 30 are preferably oriented horizontally during case transport, and then set to the necessary inclination angle by tilting case 10 at a dispensing site as illustrated.

Latched retainers 40 hold objects 25 in their retained positions in the array within case 10, as shown in FIG. 2; except one object **25*a* is shown gravitationally sliding out of its array position by unlatching of its retainer 40*a*. Another object 25*b* is shown dispensed to access tray 16**.

Retainers 40 are preferably arranged at the access ends 32 of tubes 40, as shown in FIG. 2, and in this position they block entry or exit of objects 25 from the array in case 10. It is also possible to arrange retainers 40 near the closed or opposite end of tubes 30 to engage lips or edges of objects 25.

Figure 3:
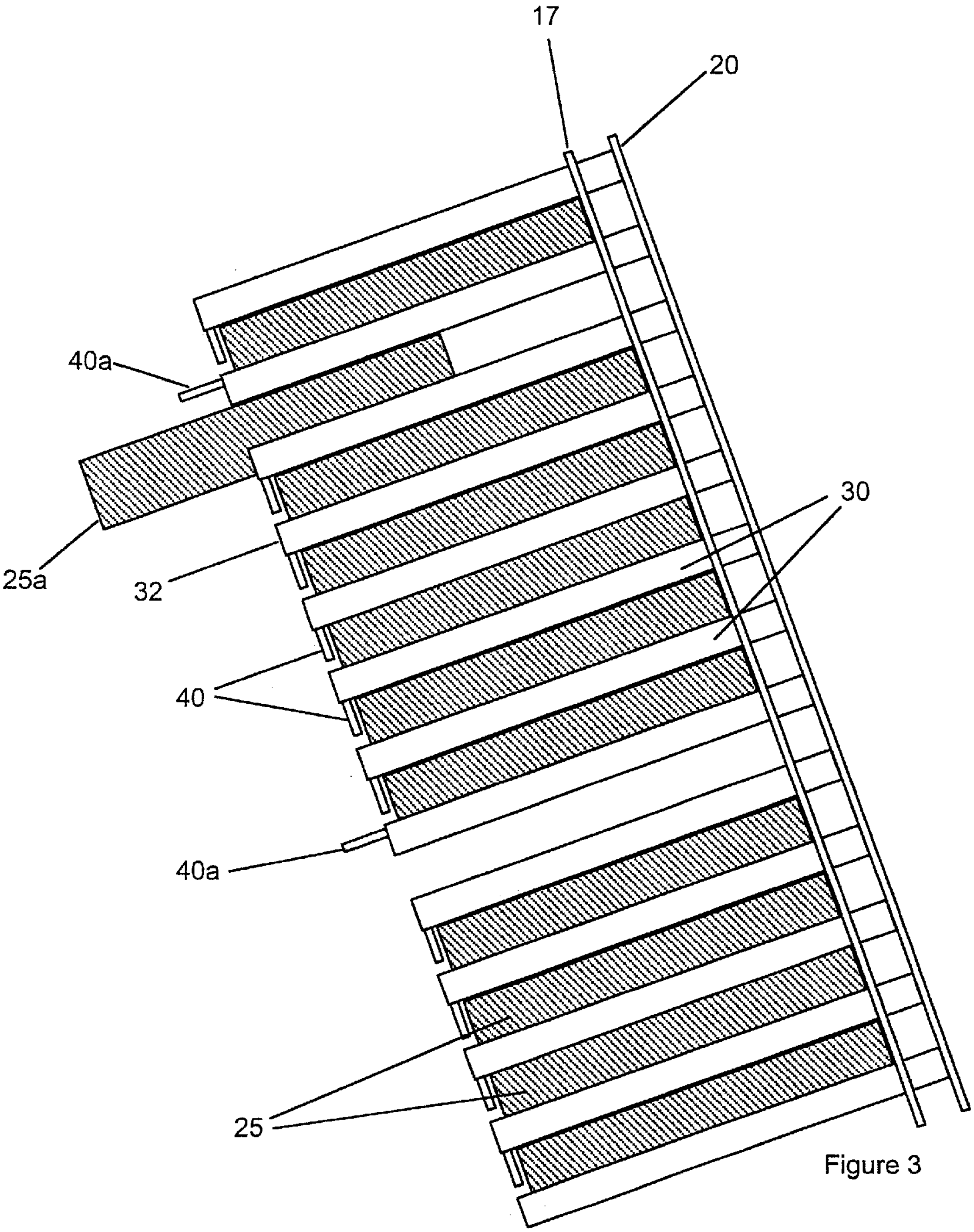
FIG. 3 is a schematic elevational view of a preferred embodiment of an object-supporting array useable in the dispenser of FIGS. 1 and 2.

FIG. 3 shows more detail of the array structure removed from case 10 and dispensing site 15, but inclined at a dispensing angle. Latched retainers 40 hold objects 25 in their places between support tubes 30, and an unlatched retainer **40*a* allows a released object 25*a* to slide gravitationally out of an access side of the array, as illustrated. Another unlatched retainer 40*a* stands open above an empty place from which an object 25** has been dispensed.

A plate 17 preferably provides a principal support for tubes 30. Plate 17 can be drilled to accept tubes 30, or tubes 30 can be integrally molded with a support plate or backing. Additional support for tubes 30 is preferably provided by circuit board 20, which is preferably arranged in a rear or non-access region of a portable case 10. Support plate 17 is preferably spaced from circuit board 20 so that tubes 30 are securely mounted to extend from circuit board 20 to support plate 17 and on forward to an access side 35 of the array where objects 25 can enter and exit.

Circuit board 20 preferably includes the necessary circuit elements to store records of loading information of objects 25 and store records of dispensing transactions that occur when authorized recipients enter information at a dispensing site and receive objects 25. Such memory travels with case 10, when case 10 is made portable. Circuit board 20 also preferably includes circuitry necessary for operating unlatching mechanisms for retainers 40. Circuit board 20 can thus do double duty providing some structural support for the closed ends of tubes 30, while providing electrical connections necessary to operate the unlatching mechanisms arranged within tubes 30.

Figure 4:
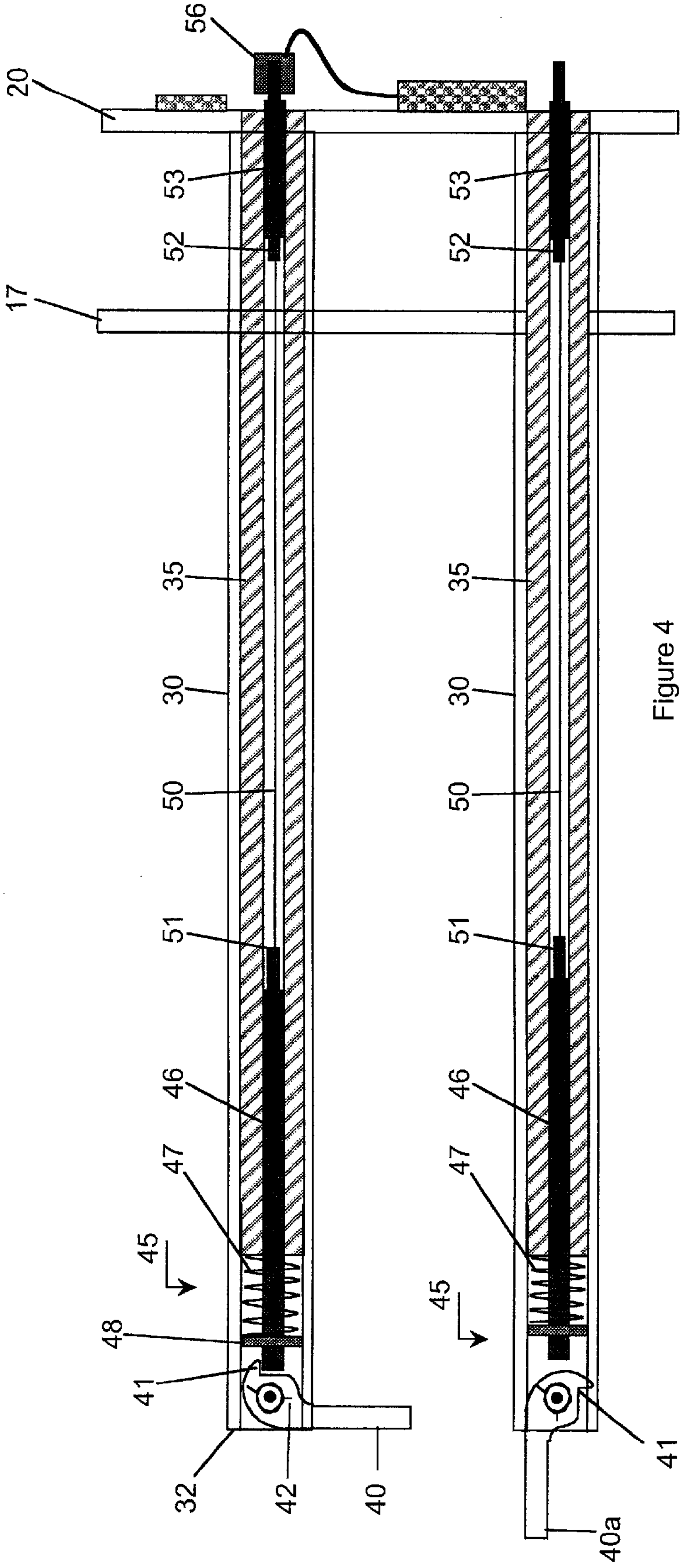
FIG. 4 is an enlarged schematic view of preferred embodiments of object support tubes and a retainer unlatching mechanism suitable for use in the structures of FIGS. 1–3.

A preferred embodiment of an unlatching mechanism 45 for retainers 40 is schematically shown in FIG. 4. The unlatching mechanism 45 is preferably arranged within an inner tube 35 fitted within support tube 30. Unlatching mechanism 45 includes a latch pin 46 that is moveable laterally between a latched position shown in the upper part of FIG. 4 and an unlatched position shown in the lower part of FIG. 4. A spring 47 biases latch pin 46 into latching engagement with a latch edge 41 of retainer 40, and to accomplish this, spring 47 is preferably a compression spring arranged between an end of inner tube 35 and a washer 48 fixed to latch pin 46.

A shape memory material preferably in the form of a wire, tape, or other elongated element 50, is preferably made of a nickel-titanium alloy, which provides the motive power for moving latch pin 46 to an unlatched position. The preference for using memory material 50 is based on factors such as light weight, compactness, low energy consumption, and reliable operation. To accomplish its task, memory material 50 extends from a connection 51 with latch pin 46 to a connection 52 with an adapter 53 arranged at a rear or closed end of inner tube 35. Adapter 53 preferably has one of several plug-in connector forms so that it can plug into an electrified socket 56 pre-arranged on circuit board 20. Alternatively, adapter 53 can have a soldered or other connection to a circuit element on board 20.

Figure 5:
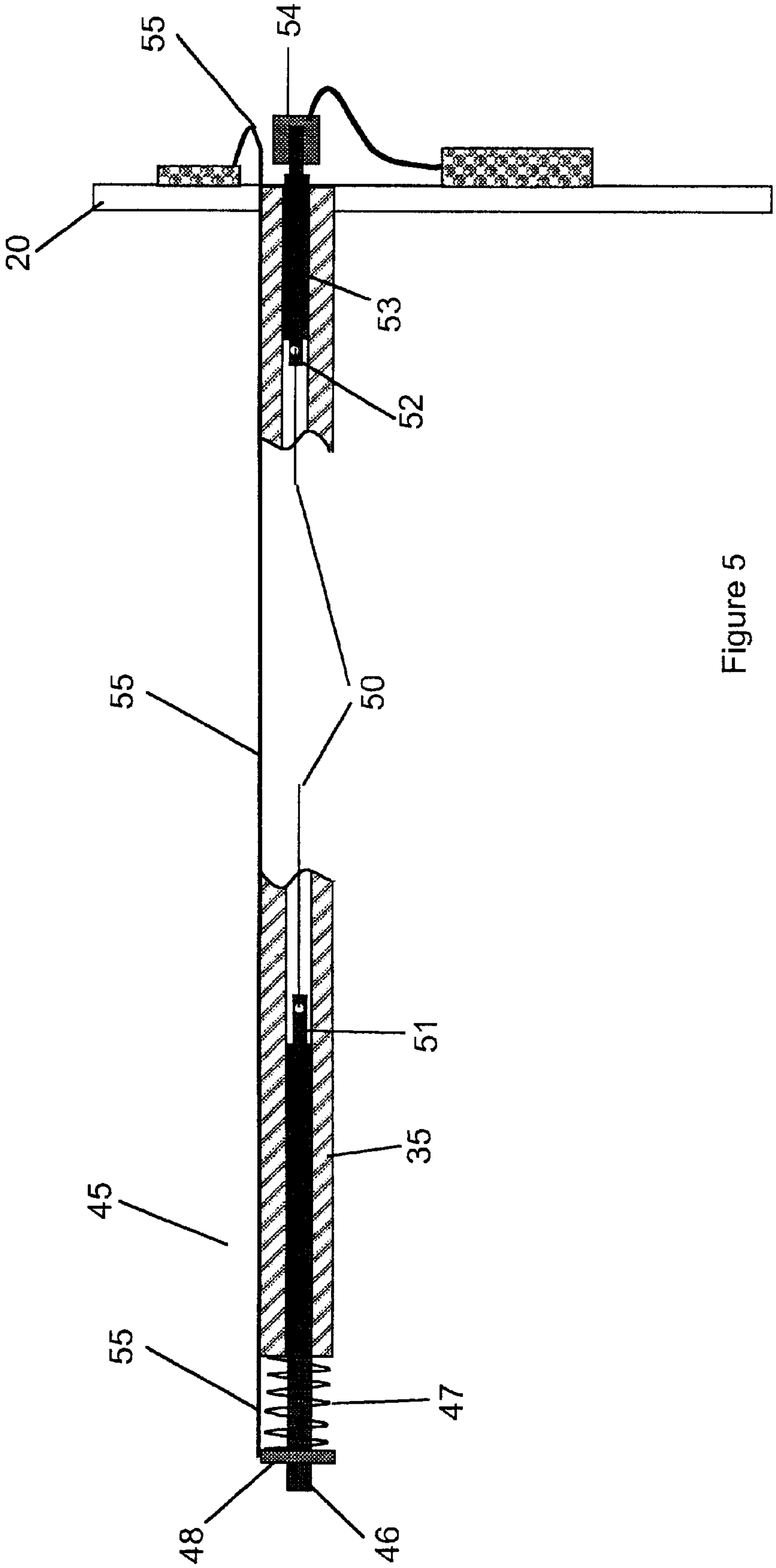
FIG. 5 is an enlarged, fragmentary, and partially schematic view of the retainer unlatching mechanism of FIG. 4.

More details of unlatching mechanism 45 are shown in FIG. 5. A wire 55 completing a circuit for memory material 50 preferably extends from washer 48 along the length of inner tube 35 to an electrical connection on circuit board 20. For this purpose, inner tube 35 can be formed with a groove to receive and hold wire 55 in place when inner tube 35 is fitted within outer support tube 30. Wire 55 need not be formed of memory material, and the illustrated preferred arrangement economizes on the more expensive memory material 50. Its connections 51 and 52 are preferably formed by crimping, swaging, or other mechanical attachment. When memory material 50 is in the form of a wire, it can be threaded through holes in connectors 51 and 52 and then crimped in place. Memory material 50 can also be arranged in its own complete circuit by extending in a loop from circuit board 20 to latch pin 46 and back to circuit board 20.

Retainer 40 is preferably biased to an unlatched position by a torsion spring 42 having one end engaging retainer 40 and another end fixed in place on tube 30. Many other arrangements of torsion springs are possible. When unlatched by movement of latch pin 46, retainer 40*a* springs open to the position illustrated in the lower part of FIG. 4.

The preferred unlatching mechanism 45 co-operates with the other elements explained above in holding objects 25 securely in place within the dispensing array until a retainer 40 is unlatched by movement of latch pin 46. This occurs via memory elements and circuitry arranged on circuit board 20. Retainers 40 can be selectively unlatched to dispense objects 25 at a dispensing site or to make array spaces available for loading objects 25 into the array.

We claim:

1. A dispenser comprising:

a. a support structure arranged in a portable case and configured to receive and hold objects in an array for dispensing;

b. retainers mounted on the support structure so that each one of the retainers retains a corresponding one of the objects in a held position in the array;

c. the support structure being oriented in a dispensing position so that selectively releasing any one of the objects for dispensing allows the released object to move out of the support structure and drop downward gravitationally;

d. each one of the retainers being movable between a latched position blocking exit of the corresponding one of the objects from its held position and an unlatched position allowing entry of the corresponding one of the objects into the held position and exit of the corresponding one of the objects from the held position when released for dispensing;

e. the support structure having latch mechanisms that latch and unlatch the retainers; and f. microcircuitry arranged to operate the latch mechanisms to unlatch the retainers and thereby release selected objects for dispensing.

2. The dispenser of claim 1 wherein the portable case in a loading position is oriented to receive and hold the objects until the retainers are latched.

3. The dispenser of claim 1 wherein the retainers are biased to spring open when unlatched.

4. The dispenser of claim 1 wherein the objects are contained in packages.

5. The dispenser of claim 1 wherein the latch mechanisms are arranged in tubes, and the retainers are mounted on access ends of the tubes.

6. The dispenser of claim 5 wherein the tubes have smaller diameters than the objects and are arranged in spaces between the objects.

7. The dispenser of claim 5 wherein the tubes are arranged as part of the support structure.

8. A system dispensing a variety of objects, the system comprising:

a. each of the objects being contained in a package;

b. a supporting structure configured to support an array of the packages for dispensing;

c. latchable and unlatchable retainers arranged on the support structure so that each one of the retainers holds a corresponding one of the packages in place in the array, the retainers and packages being arranged so that any selected retainer can be unlatched to dispense the corresponding one of the packages directly from the array; and d. the supporting structure being mounted in a dispensing position so that unlatching one of the retainers releases the corresponding one of the packages which thereupon falls gravitationally from the supporting structure for dispensing.

9. The system of claim 8 wherein the supporting structure has latch mechanisms to latch and unlatch the retainers and includes microcircuitry arranged to unlatch the latch mechanisms.

10. The system of claim 8 wherein the supporting structure has an access side through which the packages can enter and exit the support structure when the retainers are unlatched.

11. The system of claim 8 wherein the supporting structure is arranged in a portable case that is mounted securely at a dispensing site.

12. The system of claim 8 wherein the supporting structure has mechanisms that unlatch the retainers, the mechanisms are actuated by memory material, and the mechanisms are arranged in tubes located between the packages.

13. The system of claim 12 wherein microcircuitry operating the mechanisms is in communicating connection with the memory materials in the tubes.

14. A dispensing array comprising:

a. a support structure including microcircuitry having a memory of information identifying objects loaded into the array for dispensing;

b. the support structure having an access side allowing the objects to be inserted into the support structure for dispensing;

c. the support structure being mounted so that the objects can gravitationally drop out of the access side of the support structure when released for dispensing;

d. the support structure having an array of tubes holding latchable and unlatchable retainers arranged on access ends of the tubes so that one of the retainers corresponds to each one of the objects;

e. latch mechanisms for the retainers being arranged in the tubes and being operably connected to the microcircuitry; and f. the retainers being selectively unlatched by the microcircuitry to permit loading of the objects into the array and to release selected ones of the objects for dispensing from the array.

15. The dispensing array of claim 14 wherein the support structure is arranged in a portable case that is carried to and from a dispensing site.

16. The dispensing array of claim 14 wherein the objects are packaged.

17. The dispensing array of claim 14 wherein the microcircuitry is arranged within the support structure.

18. The dispensing array of claim 17 wherein the latch mechanisms are unlatched by memory material in response to signals from the microcircuitry.

19. A dispensing system comprising:

a. a portable case that is carried to and from a dispensing site;

b. the case containing a structure supporting an array of tubes arranged to retain packaged objects;

c. the tubes and the retained packaged objects being oriented at the dispensing site to allow selected ones of the packaged objects to be gravitationally dispensed when released;

d. manually latchable and electrically unlatchable retainers mounted on the tubes so that each retainer can hold and release a corresponding one of the packaged objects;

e. latching mechanisms for the retainers being arranged within the tubes to be unlatched by memory material;

f. the case containing microcircuitry having a memory of information identifying objects loaded into the tube array;

g. the microcircuitry being arranged to actuate the latching mechanisms to selectively unlatch the retainers; and h. the retainers being manually latchable and being biased to spring open when unlatched.

20. The dispensing system of claim 19 wherein the microcircuitry is arranged on the structure supporting the tubes to communicate with the memory materials.

21. The dispensing system of claim 19 wherein the latching mechanisms are spring-biased to retainer latching positions and are moved against the spring bias by the memory materials.

22. The dispensing system of claim 19 wherein the microcircuitry is arranged on a circuit board mounted on the structure supporting the tubes.

23. A dispensing array comprising:

a. an array configured to support packaged objects for dispensing;

b. the array including tubes each of which has a latchable and unlatchable retainer holding one of the packaged objects in the array when the retainer is latched;

c. a latch mechanism arranged in each of the tubes to latch and unlatch each retainer;

d. the latch mechanisms being spring-biased into latching positions;

e. the retainers being manually latchable; and f. memory materials being arranged to move the latch mechanisms against the spring bias to unlatch the retainers.

24. The dispensing array of claim 23 wherein the array is arranged at a dispensing site so that unlatching a retainer and releasing one of the packaged objects results in the packaged object falling gravitationally from the array.

25. The dispensing array of claim 23 wherein the array is arranged in a portable case that is loaded with the packaged objects at a loading site and transported to a dispensing site.

26. The dispensing array of claim 23 including microcircuitry having a memory of information identifying the packaged objects loaded into the array.

27. The dispensing array of claim 26 including an operative connection between the microcircuitry and the memory materials so signals from the microcircuitry can selectively actuate the memory wires to unlatch the latch mechanisms.

28. The dispensing array of claim 23 wherein the retainers are spring biased to open when unlatched.

* * * * *